(12) United States Patent
Choi (10) Patent No.: US 11,667,048 B2
(45) Date of Patent: Jun. 6, 2023

(54) PIPE CUTTING DEVICE

(71) Applicant: DCSENG CO. LTD., Chungcheongbuk-do (KR)

(72) Inventor: Insung Choi, Daejeon (KR)

(73) Assignee: DCSENG CO. LTD.

( * ) Notice: Subject to any disclaimer, the term of this patent is extended or adjusted under 35 U.S.C. 154(b) by 0 days.

(21) Appl. No.: 17/445,207

(22) Filed: Aug. 17, 2021

(65) Prior Publication Data

US 2022/0126473 A1     Apr. 28, 2022

(30) Foreign Application Priority Data

Oct. 26, 2020   (KR) .......................... 10-2020-0139414

(51) Int. Cl.
| | | |
|---|---|---|
| *B26D 3/16* | (2006.01) | |
| *B26D 1/42* | (2006.01) | |
| *B26D 7/01* | (2006.01) | |
| *B26D 7/26* | (2006.01) | |

(52) U.S. Cl.
CPC ............... *B26D 3/16* (2013.01); *B26D 1/42* (2013.01); *B26D 7/01* (2013.01); *B26D 7/2628* (2013.01); *B26D 2007/013* (2013.01)

(58) Field of Classification Search
CPC ... B26D 3/16; B26D 1/42; B26D 7/01; B26D 7/2628; B26D 2007/013
See application file for complete search history.

(56) References Cited

U.S. PATENT DOCUMENTS

| | | | |
|---|---|---|---|
| 5,826,470 A | 10/1998 | Tremblay | |
| 7,152,325 B2 | 12/2006 | Green et al. | |
| 2007/0214648 A1* | 9/2007 | Lazarevic | B23D 21/04 30/102 |
| 2009/0165306 A1* | 7/2009 | Nasiell | B23D 21/04 30/101 |
| 2010/0088898 A1* | 4/2010 | Thorson | B23D 21/04 30/95 |

FOREIGN PATENT DOCUMENTS

| | | | |
|---|---|---|---|
| GB | 14602 | * | 5/1916 |
| GB | 146022 A | | 5/1916 |

(Continued)

OTHER PUBLICATIONS

Feb. 18, 2022 European Search Report issued in corresponding European Application No. EP21192230.7A.

(Continued)

*Primary Examiner* — Jonathan G Riley
(74) *Attorney, Agent, or Firm* — Honigman LLP; Brett A. Krueger (57) ABSTRACT

A pipe cutting device includes: a body; a pipe fixing part disposed adjacent to a hollow hole of the body and capable of fixing a pipe; a rotating plate coupled to the body so as to be rotatable about a center axis of the hollow hole and connected to a first driving part to be rotationally controlled; a cam coupled to the rotating plate so as to be rotatable about a rotation shaft at a point spaced apart from the center axis; and a cutter part coupled to the rotating plate to rotate together with the rotating plate and to come into contact with the cam such that, according to rotation of the cam, a cutting tip moves forwards and backwards the center axis.

4 Claims, 10 Drawing Sheets

(56) References Cited

FOREIGN PATENT DOCUMENTS

| | | |
|---|---|---|
| GB | 2 195 935 A | 4/1988 |
| JP | 52119588 A | 10/1977 |
| JP | S61121813 A | 6/1986 |
| JP | 08150509 A | 6/1996 |
| JP | 09123013 A | 5/1997 |
| JP | 2000-514367 A | 10/2000 |
| KR | 101239164 B1 | 3/2013 |
| KR | 20150103467 * | 9/2015 |
| KR | 20150103467 A | 9/2015 |
| KR | 1020150103467 A | 9/2015 |
| KR | 102004590 B1 | 7/2019 |

OTHER PUBLICATIONS

Japanese Patent Office, Office Action relating to application No. 2021-133219, dated Sep. 27, 2022.
JPO. Office Action relating to application No. JP 2021-133219, dated Mar. 28, 2023.

* cited by examiner

PIPE CUTTING DEVICE

CROSS REFERENCE TO RELATED APPLICATIONS

This U.S. patent application claims priority under 35 U.S.C. § 119(a) to Korean Patent Application 10-2020-0139414, filed on Oct. 26, 2020. The disclosures of this prior application is considered part of the disclosure of this application and is hereby incorporated by reference in its entirety.

BACKGROUND

1. Technical Field

The present disclosure relates to a pipe cutting device configured such that a pipe to be cut can be fixed by using a fixing part configured to mesh with the same, and a cutter part can then cut the pipe while rotating around the pipe.

2. Description of the Prior Art

A hacksaw, a pipe cutter, or the like is commonly used to cut a pipe.

The hacksaw is configured to cut a pipe by using a saw-type cutter. Pipe surfaces cut thereby are rough and have many burrs on the inner and outer peripheral edges thereof.

Figure 1:
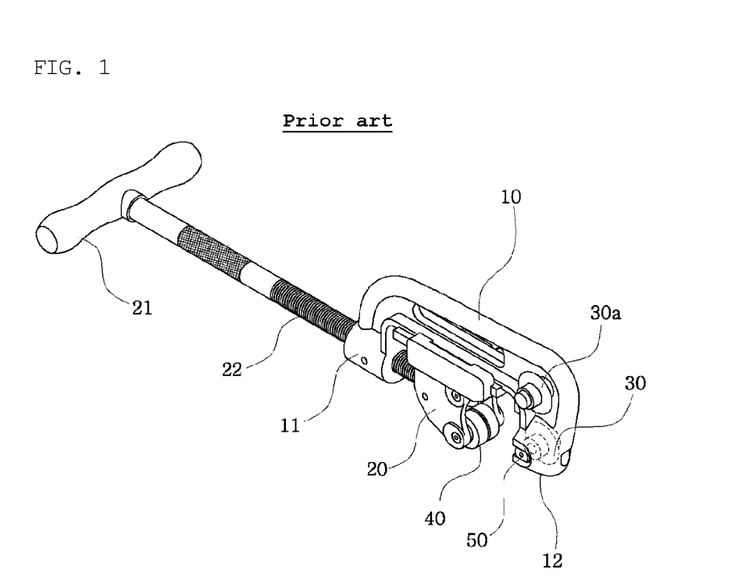
FIG. 1 is an assembly perspective view of a conventional pipe cutter.

As illustrated in FIG. 1, the pipe cutter is configured to compress and cut a pipe by using a circular cutting blade 30 and rollers 40. A pipe is cut by compressing the same and rotating the pipe cutter in a repeated manner. As a result, cut surfaces are deformed, cut parts develop a micro level of internal contraction, thereby reducing the outer diameter, and the cut surfaces need to undergo additional facing operations to be used for welding or the like. In addition, rollers made of carbon steel are used for compression and, when a pipe made of stainless steel is cut, may thus cause corrosion transition between different kinds of materials. The two cutting devices are both manually operated and thus have a problem in that cutting operations take a long time, thereby degrading the productivity.

SUMMARY

The present disclosure has been made in order to solve the above-mentioned problems, and it is an aspect of the present disclosure is to provide a pipe cutting device capable of minimizing deformation of a pipe to be cut and requiring no additional facing processing of pipe cut surfaces.

It is another aspect of the present disclosure is to provide a pipe cutting device configured such that a pipe to be cut can be fixed by a fixing part, and a cutter part can then automatically cut the pipe while rotating around the pipe.

In accordance with an aspect of the present disclosure, a pipe cutting device may include: a body having a hollow hole formed through opposite surfaces thereof along a center axis; a pipe fixing part disposed adjacent to the hollow hole and capable of fixing a pipe to be cut; a rotating plate coupled to the body so as to be rotatable about the center axis and connected to a first driving part to be rotationally controlled; a cam coupled to the rotating plate so as to be rotatable about a rotation shaft at a point spaced apart from the center axis, configured to rotate together with the rotating plate, and connected to a second driving part to be rotationally controlled; and a cutter part coupled to the rotating plate and configured to rotate together with the rotating plate and to come into contact with the cam such that, according to rotation of the cam, a cutting tip moves forwards and backwards along the center axis.

In addition, the cutter part may include: a tip holder having one side rotatably coupled to the rotating plate by a hinge and the other side coupled to the cutting tip; and a return spring coupled to the hinge and having one end fixed to the rotating plate and the other end fixed to the tip holder such that the tip holder is in close contact with the cam.

The cutter part may further include a position adjusting plate coupled to the tip holder, and the position adjusting plate may be configured to be able to move along the tip holder and to remain in a fixed position.

In addition, the first driving part configured to rotate the rotating plate and the second driving part configured to rotate the cam may employ a single driving motor.

In addition, the first driving part may include: a first rotating gear disposed coaxially with the rotating plate and coupled to the rotating plate; and a driving gear meshed with the first rotating gear and coupled to the driving motor. The second driving part may include: a second rotating gear disposed coaxially with the rotating plate, rotatably coupled to the body, and meshed with a cam rotating gear connected to the cam; a driving gear coupled to the driving motor; and at least one connection gear meshed between the second rotating gear and the driving gear to connect the driving gear to the second rotating gear.

In addition, the first rotating gear and the second rotating gear may be configured to rotate at different angular speeds from each other.

A pipe cutting device according to the present disclosure is advantageous in that the same does not compress a pipe, thereby minimizing deformation thereof, and a pipe is cut to have neatly cut surfaces, thereby requiring no additional facing processing thereof.

In addition, a fixed pipe is cut while a cutter part rotates around the same, and a cutting tip of the cutter art can automatically move forward/backward toward the center of the pipe as the cutter part rotates. This improves the productivity and efficiency.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, the pipe cutting device of the present disclosure, configured as described above, will be described in detail with reference to the accompanying drawings.

Figure 2:
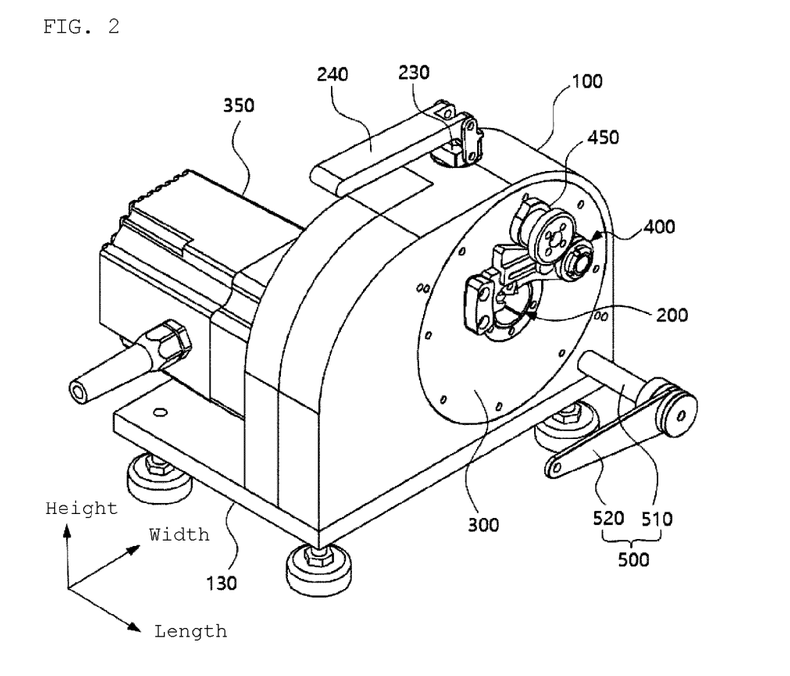
FIG. 2 is an assembly perspective view of a pipe cutting device according to one embodiment of the present disclosure.
Figure 3:
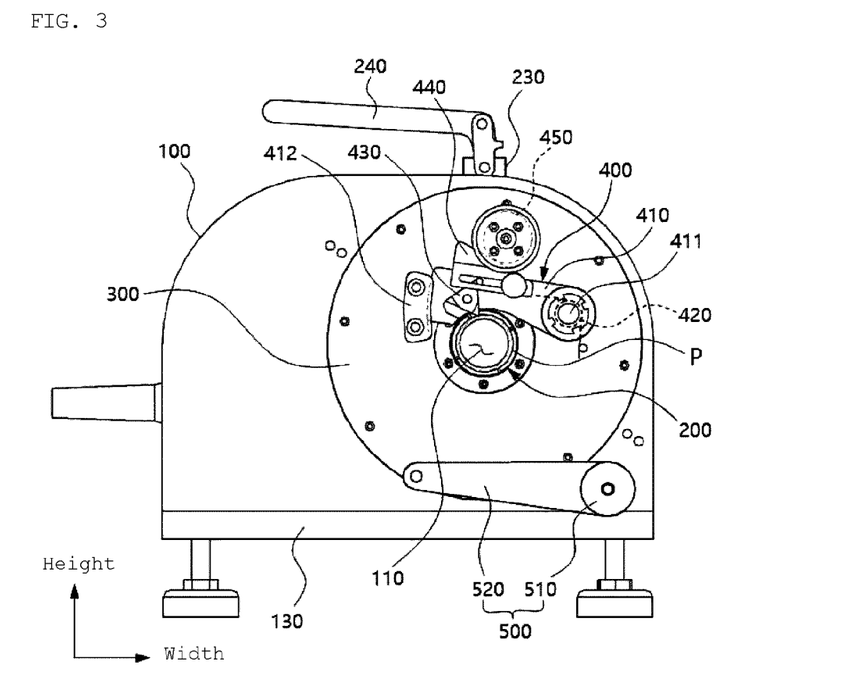
FIG. 3 is right side view of the pipe cutting device according to one embodiment of the present disclosure.
Figure 4:
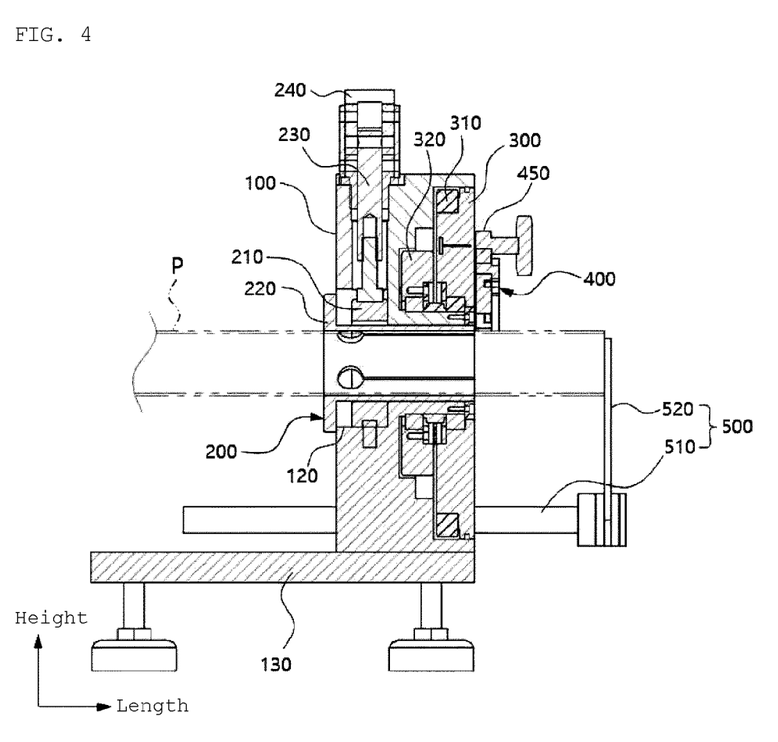
FIG. 4 is a front sectional view of the pipe cutting device according to one embodiment of the present disclosure.
Figure 5:
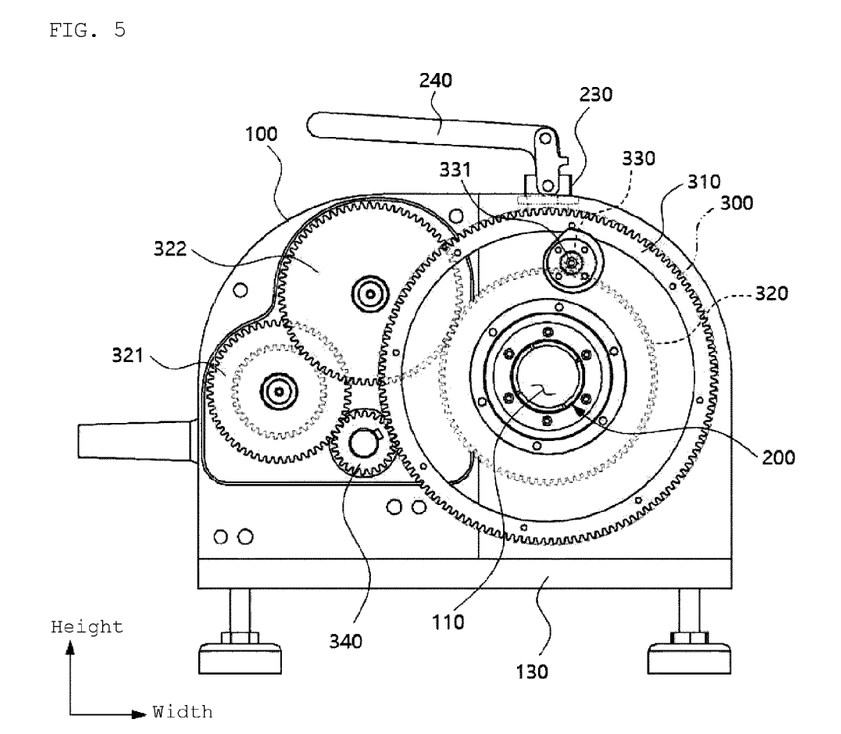
FIG. 5 illustrates an operational structure of a rotating plate and a cam in a pipe cutting device according to one embodiment of the present disclosure.

FIG. 2 is an assembly perspective view of the pipe cutting device according to one embodiment of the present disclosure, FIG. 3 is right side view of the pipe cutting device according to one embodiment of the present disclosure, and FIG. 4 is a front sectional view of the pipe cutting device according to one embodiment of the present disclosure. FIG. 5 illustrates an operational structure of a cutter part and a cutting tip in a pipe cutting device according to one embodiment of the present disclosure, the cutter part rotating about the center axis of a pipe, the cutting tip moving forwards and backwards the center of the pipe from the cutter part.

As illustrated here, the pipe cutting device according to one embodiment of the present disclosure may largely include a body 100, a pipe fixing part 200, a rotating plate 300, a cam 450, and a cutter part 400. The pipe cutting device of the present disclosure may further include a first driving part and a second driving part.

The body 100 is fixed to an upper surface of a base 130, and the body 100 is a basic structure to which other parts are fixed or coupled. The body 100 may include a hollow hole 110 formed through the opposite surfaces thereof in the longitudinal direction such that a pipe (P) to be cut can pass through and be inserted into the hollow hole 110. The body 100 may include a seating groove 120 disposed adjacent to the hollow hole 110 concaved from one side surface thereof so that a fixing block 210 can be inserted into the seating groove 120.

In addition, the pipe fixing unit 200 may serve to press and fix a pipe to be cut. The pipe fixing part 200 may be disposed adjacent to the hollow hole 110 of the body 100 and coupled to the body 100. The pipe fixing part 200 may have various structures capable of fixing and releasing a pipe. For example, the pipe fixing part 200 may have a structure in which the outer circumferential surface of the pipe inserted to pass through a center portion is wrapped and the pipe is inwardly pressed from the outer side thereof, thereby fixing the pipe.

The rotating plate 300 may be rotatably coupled to the body 100 and may be provided in the form of a circular plate having a center portion formed through the opposite surfaces thereof. In addition, the rotating plate 300 may be disposed coaxially with the center axis of the hollow hole 110 formed through the body 100, and may rotate about the center axis. The rotating plate 300 may be configured to be rotationally controlled by a first driving part, and the first driving part may include a first rotating gear 310, and a driving gear 340 coupled to a driving shaft of a driving motor 350 to rotate. The first rotating gear 310 may be coaxially fixed to one surface of the rotating plate 300 so that the rotating plate 300 and the first rotating gear 310 may rotate together about the center axis, and the first rotating gear 310 may be connected to the driving gear 340. Thus, when the driving motor 350 is operated, the rotating plate 300 connected thereto may rotate.

Figure 6:
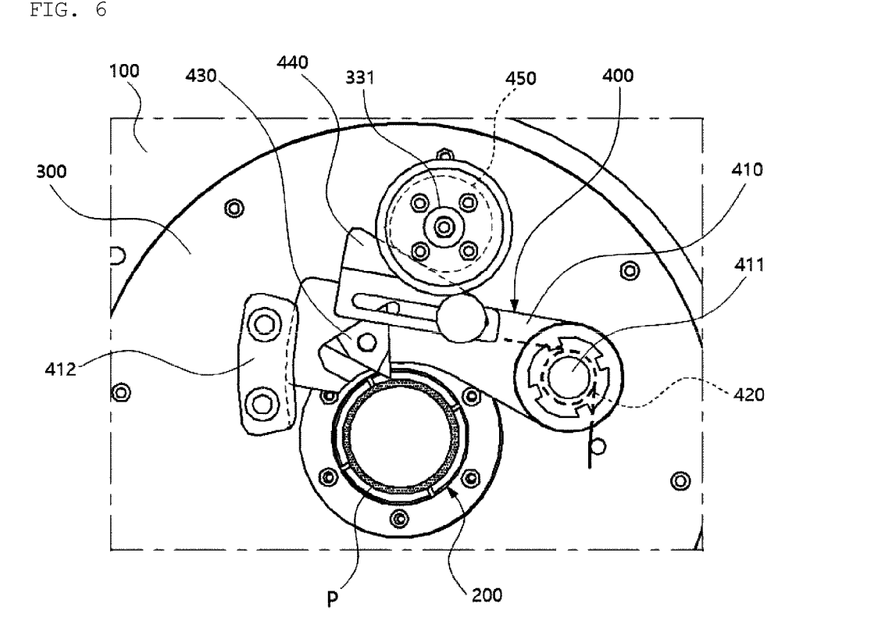
FIG. 6 illustrates a position of a cutting tip before the cutting in a pipe cutting device according to one embodiment of the present disclosure.
Figure 7:
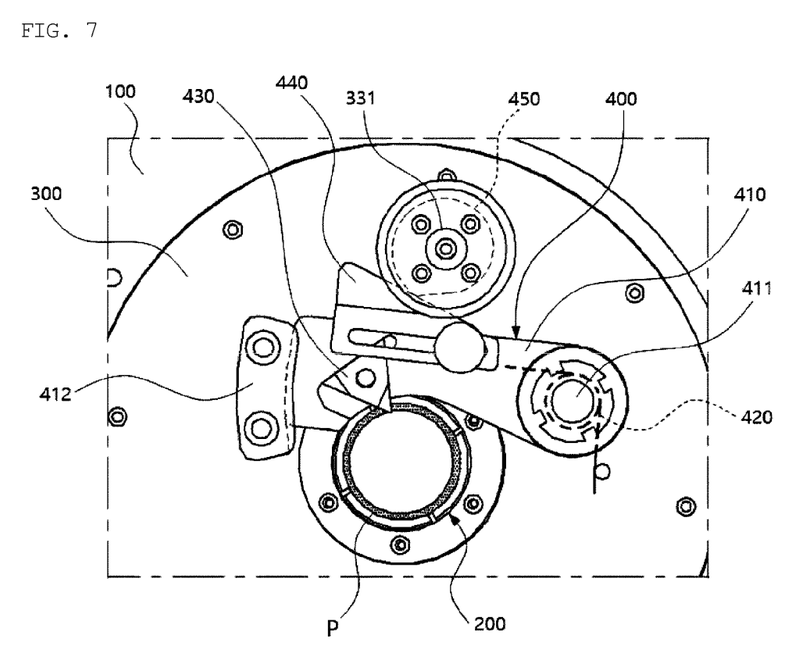
FIG. 7 illustrates a position of the cutting tip when the cutting is finished in the pipe cutting device according to one embodiment of the present disclosure.

The cam 450 may be coupled to the rotating plate 300 at a position radially spaced apart from the center axis, which is the center of rotation of the rotating plate 300, to rotate together with the rotating plate 300. The cam 450 may be coupled to the rotating plate 300 through the rotation shaft 331 to perform a rotating operation about the rotation shaft 331. As shown in FIGS. 6 and 7, the cam 450 may have a minimum diameter portion and a maximum diameter portion which are formed in the radial direction with reference to the rotation shaft 331 which is the center of rotation. The cam 450 may have a diameter gradually increasing from the minimum diameter portion in the circumferential direction and then decreasing from the maximum diameter portion. The cam 450 may be configured to be rotationally controlled by a second driving part, and the second driving part may include a second rotating gear 320, a driving gear 340, and connection gears. The second rotating gear 320 may be disposed coaxially with the rotating plate 300 and may be rotatably coupled to the body 100. The second rotating gear 320 may be meshed with a cam rotating gear 330 connected to the cam 450 by the rotation shaft 331. In addition, the second rotating gear 320 may be connected to the driving gear 340 through a 2-1 connection gear 321 and a 2-2 connection gear 322. Therefore, the first rotating gear 310 configured to rotate the rotating plate 300 and the second rotating gear 320 configured to rotate the cam 450 may be configured to be rotated by a single driving motor 350. In this case, the second rotating gear 320 may rotate at an angular speed different from that of the first rotating gear 310 by the 2-1 connection gear 321 and the 2-2 connection gear 322. Thus, while the rotating plate 300 rotates, the cam 450 may rotate on the rotating plate 300 about the rotation shaft 331. Various power transmission methods or a method using a belt, etc., in addition to a gear may be used for a power transmission method of the first driving part and the second driving part.

The cutter part 400 may include a tip holder 410, a return spring 420, and a cutting tip 430, and may further include a guide block 412 and a position adjusting plate 440. One side of the tip holder 410 may be coupled to the rotating plate 300 by a hinge 411, and thus the tip holder 410 can rotate about the hinge 411. The cutting tip 430 capable of cutting a pipe (P) may be coupled to the other side of the tip holder 410. In addition, the guide block 412 may be disposed adjacent to the other end of the tip holder 410 and the guide block 412 may be fixed to the rotating plate 300. The guide block 412 may have a concave guide groove, and the other end of the tip holder 410 may be inserted into the guide groove so that the rotational movement of the tip holder 410 can be guided along the guide groove. The return spring 420 may be, for example, a coil spring, and the return spring 420 may include a spirally wound portion fitted to the hinge 411, a wire portion which radially extends out from one side of a cylindrical shaped portion, and which is fixed to the rotating plate 300, and a wire portion which radially extends out from the other side of the cylindrical shaped portion, and which is fixed to the tip holder 410. Accordingly, a restoring force for rotating the tip holder 410 clockwise with respect to the hinge 411 may always act on the tip holder 410 by the return spring 420. The position adjusting plate 440 may be coupled to the tip holder 410 such that the position adjusting plate 440 is configured to be able to move in a direction connecting one side of the tip holder 410 to the other side thereof and remain in a fixed position. The position adjusting plate 440 may have, for example, a wedge shape so that the upper inclined surface thereof may be in contact with the cam 450. Therefore, the rotational angle range of the tip holder 410 can be adjusted by adjusting the position of the position adjusting plate 440 according to the outer diameter size of a pipe (P) to be cut, and accordingly, the range in which the cutting tip 430 moves forwards and backwards the center axis can be adjusted.

When the driving motor is operated in a state where a pipe (P) to be cut is inserted into the pipe fixing part 200 and a position of the pipe is adjusted in the longitudinal direction to be fixed, the rotating plate 300 rotates and the cam 450 and the cutter part 400 rotate about the center axis together with the rotating plate 300, so that the cutter part 400 rotates around the pipe (P). At this time, the cam 450 may push the tip holder 410 of the cutter part 400 while rotating about the rotation shaft 331, and accordingly, the cutting tip 430 may gradually move toward the inside of the pipe (P) from the outside to cut the pipe (P). When the cutting of the pipe (P) is completed, the tip holder 410 may rotate clockwise by the elasticity of the return spring 420, and thus the cutting tip 430 may automatically return to the original position where the cutting tip 430 is positioned before cutting the pipe. A state where a minimum diameter point of the cam 450 is in contact with the position adjusting plate 440 of the cutter part 400, as shown in FIG. 6, may indicate a position of the cutting tip 430 before cutting or having returned to the original position after cutting. A state where a maximum diameter point of the cam 450 is in contact with the position adjusting plate 440 of the cutter part 400, as shown in FIG. 7, may indicate a position of the cutting tip 430 which has completely cut a pipe.

As described above, the deformation of a pipe (P) can be minimized since the pipe (P) does not compress a portion adjacent to a cut surface, and no additional facing processing is required for the cut surface of the pipe (P) due to the neatly cut surface of the pipe (P). In addition, the cutting part 400 rotates around the fixed pipe (P) to cut the pipe (P). According to the rotation of the cutter part 400, the cutting tip 430 of the cutter part 400 automatically moves forwards and backwards the center of the pipe to perform cutting, thereby improving the productivity and the efficiency.

Figure 8:
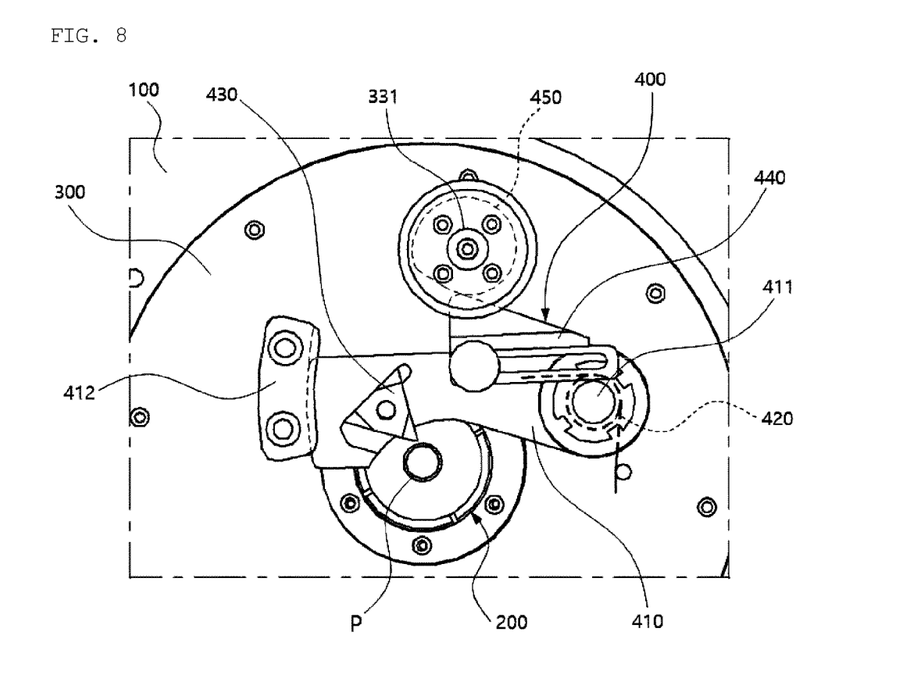
FIG. 8 illustrates an adjusted position of a cutting tip when a pipe hiving a relatively small outer diameter is cut according to an outer diameter size of a pipe in a pipe cutting device according to one embodiment of the present disclosure.

Referring to FIG. 8, when cutting a pipe (P) having a relatively small outer diameter size, the position adjusting plate 440 may be moved to the right and then be fixed such that the cutting tip 430 can be positioned adjacent to the outer diameter of the pipe (P).

Figure 9:
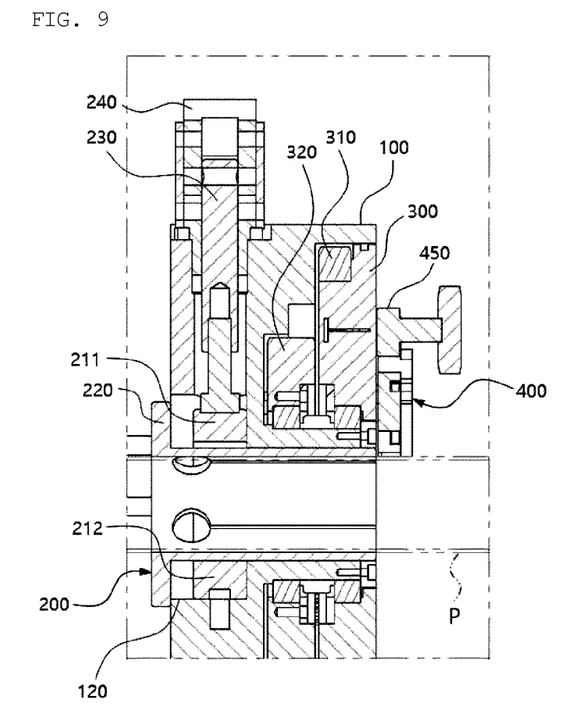
FIG. 9 is a front sectional view illustrating a detailed structure of a pipe fixing part to which a pipe is fixed in a pipe cutting device according to one embodiment of the present disclosure.
Figure 10:
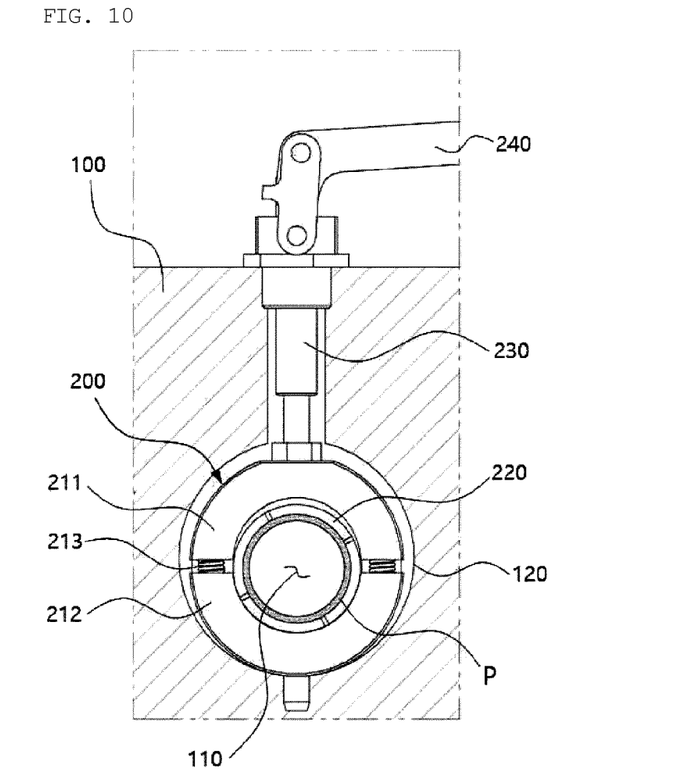
FIG. 10 is a side sectional view illustrating a detailed structure of the pipe fixing part to which the pipe is fixed in the pipe cutting device according to one embodiment of the present disclosure.

Referring to FIGS. 9 and 10, the pipe fixing part 200 may include a fixing block 210, a collet 220, and a pressing part 230. The fixing block 210 may be inserted into and mounted on the seating grove 120 disposed adjacent to the hollow hole 110 of the body 100 and concaved from one side surface thereof. The fixing block 210 may have an insertion hole formed through both surfaces of the center portion and thus may have a ring shape overall. The fixing block 210 may be divided into at least two portions along the circumferential direction. For example, as shown, the fixing block 210 may have a first block 211 and a second block 212 which correspond to the two portions. In addition, the first block 211 and the second block 212 may have opposite circumferential ends spaced apart from each other, and an elastic member 213 may be interposed between each the adjacent ends. The collet 220 through which a pipe (P) passes to be supported is inserted into the insertion hole of the fixing block 210. The collet 220 may be a commonly used and well-known commercially available product. The pressing part 230 directly presses the outer side of the fixing block 210 to contract the inner diameter of the collet 220, thereby fixing the pipe (P) inserted into the collet 220. For example, the pressing part 230 may be provided above the fixing block 210 in the height direction, the pressing part 230 may be coupled to the body 100 to be movable in the vertical direction, and a lever 240 may be rotatably coupled to the upper end of the pressing part 230. Accordingly, when the lever 240 is pressed, the pressing part 230 may move downward to press the first block 211 of the fixing block 210, thereby fixing the pipe (P). The pressing part 230 may also have various shapes.

In addition, the plurality of collets 220 may be provided, and each of the collets 220 may have the same outer diameter and different inner diameters. That is, by providing the plurality of collets 220 having inner diameters corresponding to the outer diameter sizes of the various pipes (P) to be fixed, only the collets 220 may be replaced without replacing the fixing block 210 to fix pipes (P) of various outer diameters.

In addition, the pipe cutting device of the present disclosure may further include a pipe length adjusting part 500.

The pipe length adjusting part 500 may include, for example, an adjusting bar 510 and a stopper 520. The adjusting bar 510 may have a round bar shape extending from one side coupled to the body 100 to the other side in parallel with the center axis of the body 100. The body 100 may include a hole into which one side of the adjusting bar 510 is inserted, and which is movable toward the center axis, and the body 100 may have a fixing device capable of fixing the position of the inserted adjusting bar 510. In addition, the adjusting bar 510 may rotate about the hole inserted into the body 100. The stopper 520 may be fixedly coupled to the other side of the adjusting bar 510, and the free end portion may be disposed on the center axis of the body 100. Accordingly, after the adjusting bar 510 and the stopper 520 are moved in advance to a position corresponding to a desired length of a pipe (P) to be cut, along the center axis direction of the body 100, and are fixed at the position, the pipe is fixed by pushing the pipe from left to right such that the end of the pipe touches the stopper 520, whereby pipe cutting work can be performed accurately. When length adjustment of a pipe is not required, the stopper 520 may be rotated about the adjusting bar 510 to move the same to a location spaced apart from the center axis of the body 100. The pipe length adjusting part 500 may be deformed in various ways.

The present disclosure is not limited to the above embodiments, and the scope of application is varied, and various modifications are possible by anyone with ordinary knowledge in the field to which the present disclosure belongs, without departing from the gist of the present disclosure as claimed in the claims.

BRIEF DESCRIPTION OF REFERENCE NUMERALS

| | |
|---|---|
| 100: Body | 110: Hollow hole |
| 120: Seating groove | 130: Base |
| 200: Pipe fixing part | 210: Fixing block |
| 211: First block | 212: Second block |
| 213: Elastic member | 220: Collet |
| 230: Pressing part | 240: Lever |
| 300: Rotating plate | 310: Frist rotating gear |
| 320: Second rotating gear | 321: 2-1 connection gear |
| 322: 2-2 connection gear | 330: Cam rotating gear |
| 331: Rotation shaft | 340: Driving gear |

| | |
|---|---|
| 350: Driving motor | |
| 400: Cutter part | 410: Tip holder |
| 411: Hinge | 412: Guide block |
| 420: Return spring | 430: Cutting tip |
| 440: Position adjusting plate | 450: Cam |
| 500: Pipe length adjusting part | 510: Adjusting bar |
| 520: Stopper | P: Pipe |

What is claimed is:

1. A pipe cutting device comprising:
 a body having a hollow hole formed through opposite surfaces thereof along a center axis;
 a pipe fixing part disposed adjacent to the hollow hole and capable of fixing a pipe to be cut;
 a rotating plate coupled to the body so as to be rotatable about the center axis and connected to a first driving part to be rotationally controlled;
 a cam coupled to the rotating plate so as to be rotatable about a rotation shaft at a point spaced apart from the center axis, configured to rotate together with the rotating plate, and connected to a second driving part to be rotationally controlled; and
 a cutter part coupled to the rotating plate and configured to rotate together with the rotating plate and to come into contact with the cam such that, according to rotation of the cam, a cutting tip moves forwards and backwards along the center axis, wherein the cutter part comprises:
  a tip holder, wherein one side thereof is rotatably coupled to the rotating plate with a hinge and the cutting tip is coupled to the other side thereof;
  a return spring coupled to the hinge and having one end fixed to the rotating plate and the other end fixed to the tip holder such that the tip holder is in close contact with the cam; and
  a wedge-shaped position adjusting plate coupled so as to be able to move along the tip holder and to remain in a fixed position, and configured to adjust a rotational angle range of the tip holder by adjusting a position of the position adjusting plate left and right according to an outer diameter size of the pipe to be cut in a state in which an upper inclined surface of the position adjusting plate is in contact with the cam.

2. The pipe cutting device of claim 1, wherein the first driving part configured to rotate the rotating plate and the second driving part configured to rotate the cam employ a single driving motor.

3. The pipe cutting device of claim 2, wherein the first driving part comprises:
 a first rotating gear disposed coaxially with the rotating plate and coupled to the rotating plate; and
 a driving gear meshed with the first rotating gear and coupled to the driving motor, and
 wherein the second driving part comprises:
  a second rotating gear disposed coaxially with the rotating plate, rotatably coupled to the body, and meshed with a cam rotating gear connected to the cam;
  a driving gear coupled to the driving motor; and
  at least one connection gear meshed between the second rotating gear and the driving gear to connect the driving gear to the second rotating gear.

4. The pipe cutting device of claim 3, wherein the first rotating gear and the second rotating gear are configured to rotate at different angular speeds from each other.

* * * * *